United States Patent [19]
Yan et al.

[11] Patent Number: 5,216,427
[45] Date of Patent: Jun. 1, 1993

[54] LAND-MOBILE SATELLITE COMMUNICATION SYSTEM

[75] Inventors: Tsun-Yee Yan, Northridge; William Rafferty, Pasadena; Khaled I. Dessouky, Santa Monica; Charles C. Wang, Arcadia; Unjeng Cheng, Laguna Niguel, all of Calif.

[73] Assignee: California Institute of Technology, Pasadena, Calif.

[21] Appl. No.: 607,574

[22] Filed: Nov. 1, 1990

[51] Int. Cl.$^5$ ............................................. H04B 7/185
[52] U.S. Cl. .................................. 342/352; 370/94.1; 370/85.2; 370/60
[58] Field of Search .............. 342/352; 370/94.1, 85.2, 370/60

[56] References Cited

U.S. PATENT DOCUMENTS

| | | | |
|---|---|---|---|
| 4,504,946 | 3/1985 | Raychaudhuri | 370/95.3 |
| 4,594,706 | 6/1986 | Kobayashi | 370/94.1 |
| 4,688,213 | 8/1987 | Raychaudhuri | 370/94.1 |
| 4,907,224 | 3/1990 | Scoles et al. | 370/85.2 |

Primary Examiner—Theodore M. Blum
Attorney, Agent, or Firm—Loyal M. Hanson

[57] ABSTRACT

A satellite communications system includes an orbiting communications satellite for relaying communications to and from a plurality of ground stations, and a network management center for making connections via the satellite between the ground stations in response to connection requests received via the satellite from the ground stations, the network management center being configured to provide both open-end service and closed-end service. The network management center of one embodiment is configured to provides both types of service according to a predefined channel access protocol that enables the ground stations to request the type of service desired. The channel access protocol may be configured to adaptively allocate channels to open-end service and closed-end service according to changes in the traffic pattern and include a free-access tree algorithm that coordinates collision resolution among the ground stations.

7 Claims, 9 Drawing Sheets

| COLUMN A | | | COLUMN B | COLUMN C | COLUMN D | COLUMN E |
|---|---|---|---|---|---|---|
| Originating Party \ Destined Party | | | MODES | MT'S SUBSCRIBED TO THE SAME BS'S | MT'S SUBSCRIBED TO DIFFERENT BS'S | BASE STATION |
| MOBILE TERMINAL (TELEPHONE AND DISPATCH) | VOICE | | TELEPHONE | | NO | YES |
| | | | DISPATCH | DOUBLE HOP THROUGH THE SAME BS | DOUBLE HOP THROUGH THE ORIGINATED PARTY BS (POSSIBLY CROSS CHARGED TO DESTINED PARTY BS) | (BCQ) YES |
| | DATA | | DISPATCH | | | YES |
| | | | LONG FILE | | NO | YES |
| BASE STATION | VOICE | | TELEPHONE | | NO | |
| | | | DISPATCH | | YES | |
| | DATA | | DISPATCH | YES | | YES (THROUGH K-BAND CROSS STRAP) |
| | | | LONG FILE | | NO | |

Fig. 3

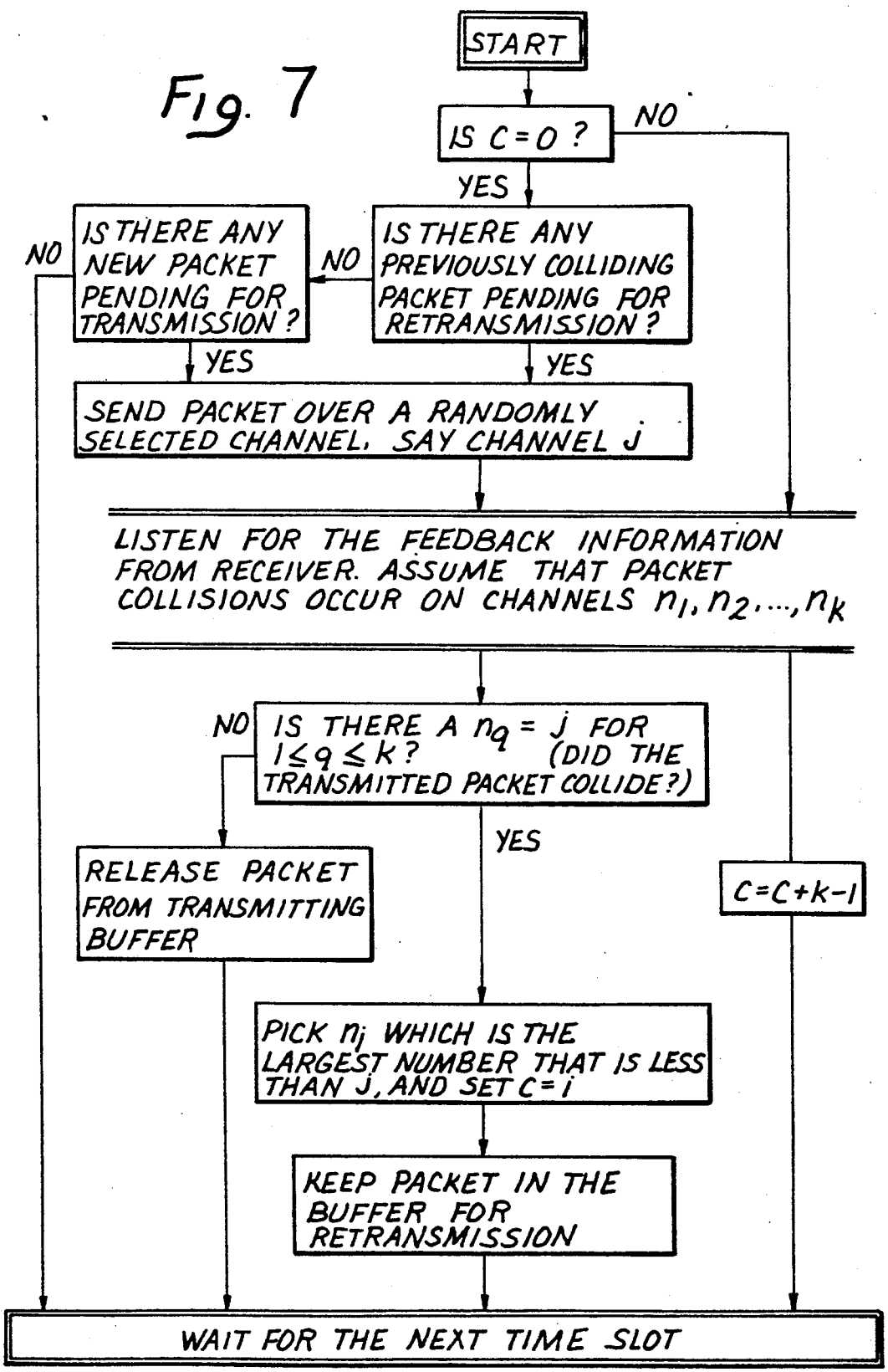

LAND-MOBILE SATELLITE COMMUNICATION SYSTEM

ORIGIN OF INVENTION

The invention described herein was made in the performance of work under a NASA contract and is subject to the provisions of Public Law 96-517 (35 USC 202) in which the Contractor has elected to retain title.

BACKGROUND OF THE INVENTION

1. Technical Field

This invention relates to satellite communications, and more particularly to a satellite communication system with improved network architecture for the land-mobile satellite service.

2. Background Information

"Satellite communications" refers to communications via an orbiting communications satellite. The satellite carries communications equipment that relays signals to and from ground stations while the satellite orbits high above earthbound relay stations. Broad coverage results and that attracts the land-mobile service where users may roam over a service area as large as the continental United States.

But existing satellite communications systems have certain drawbacks. Consider, for example, a system having a communications satellite in geosynchronous orbit and a computerized Network Management Center (NMC) on earth. The satellite relays communications from ground stations to the NMC and from the NMC back to the ground stations. In that way, the system channels all ground station communications through the NMC (including both channel requests and traffic) so that the NMC can effectively orchestrate system use according to a predefined protocol.

A ground station wishing to use the system sends a connection request via the satellite to the NMC. Then the NMC makes connection arrangements with that ground station and the ground station being called by communicating with them via the satellite. The two ground stations then connect via the satellite and the NMC over a channel the NMC assigns, and thereafter exchange any of various forms of traffic (e.g., packetized data and voice communications). They continue to exchange traffic that way as long as desired and then relinquish the channel.

But channel availability can be very limited. With 7 MHz uplink and downlink bandwidths, for example, the entire service area has access to relatively few channels compared to a potentially large number of users. That can cause severe traffic congestion. So a need exists for an improved satellite communication system for the land-mobile service that more efficiently accommodates traffic requirements within the available bandwidth— one that maximizes channel availability while minimizing service delays.

SUMMARY OF THE INVENTION

This invention solves the problem outlined above by providing a satellite communication system that features both open-end service (voice channels) and closed-end service (data channels). Users request the type service desired and the system makes connections accordingly. That significantly alleviates congestion by providing more efficient (and less costly) closed-end service for short data transfers. One embodiment even adaptively changes the number of channels allocated to each service with changes in the voice/data traffic pattern. In addition, an improved channel access protocol may be included based on a free-access tree algorithm subsequently described that coordinates collision resolution among all users for higher throughput and better stability. Thus, the system provides greater time and frequency efficiency in a way better adapted to the requirements of the land-mobile service.

Generally, a system constructed according to the invention includes an orbiting communications satellite for relaying communications to and from a plurality of ground stations, and a control center (i.e., a NMC) for making connections (i.e., sending communication channel assignments) via the satellite to the ground stations in response to connection requests received via the satellite from the ground stations. According to a major aspect of the invention, the control center is configured to respond to a connection request that specifies a requested one of open-end service and closed-end service according to a predefined channel access protocol by sending a channel assignment to the ground station that provides the requested one of open-end service and closed-end service.

According to another aspect of the invention, the control center is configured to make the connections between the ground stations over a plurality of channels, to allocate some of the channels to open-end service and some of the channels to closed-end service, and to change the number of channels allocated to each service according to changes in the distribution of the connection requests between those specifying open-end service and those specifying closed-end service. According to yet another aspect, the control center is configured to provide the open-end service and closed-end service according to a predefined channel access protocol that enables random access on a demand assigned basis. Preferably the channel access protocol is configured to include a free-access collision resolution algorithm that coordinates collision resolution among the ground stations.

BRIEF DESCRIPTION OF THE DRAWINGS

FIG. 3 is a logical connectivity matrix for the system;

FIG. 7 is a flow chart for the counting algorithm in the free-access tree algorithm;

DESCRIPTION OF THE PREFERRED EMBODIMENTS

Figure 1:
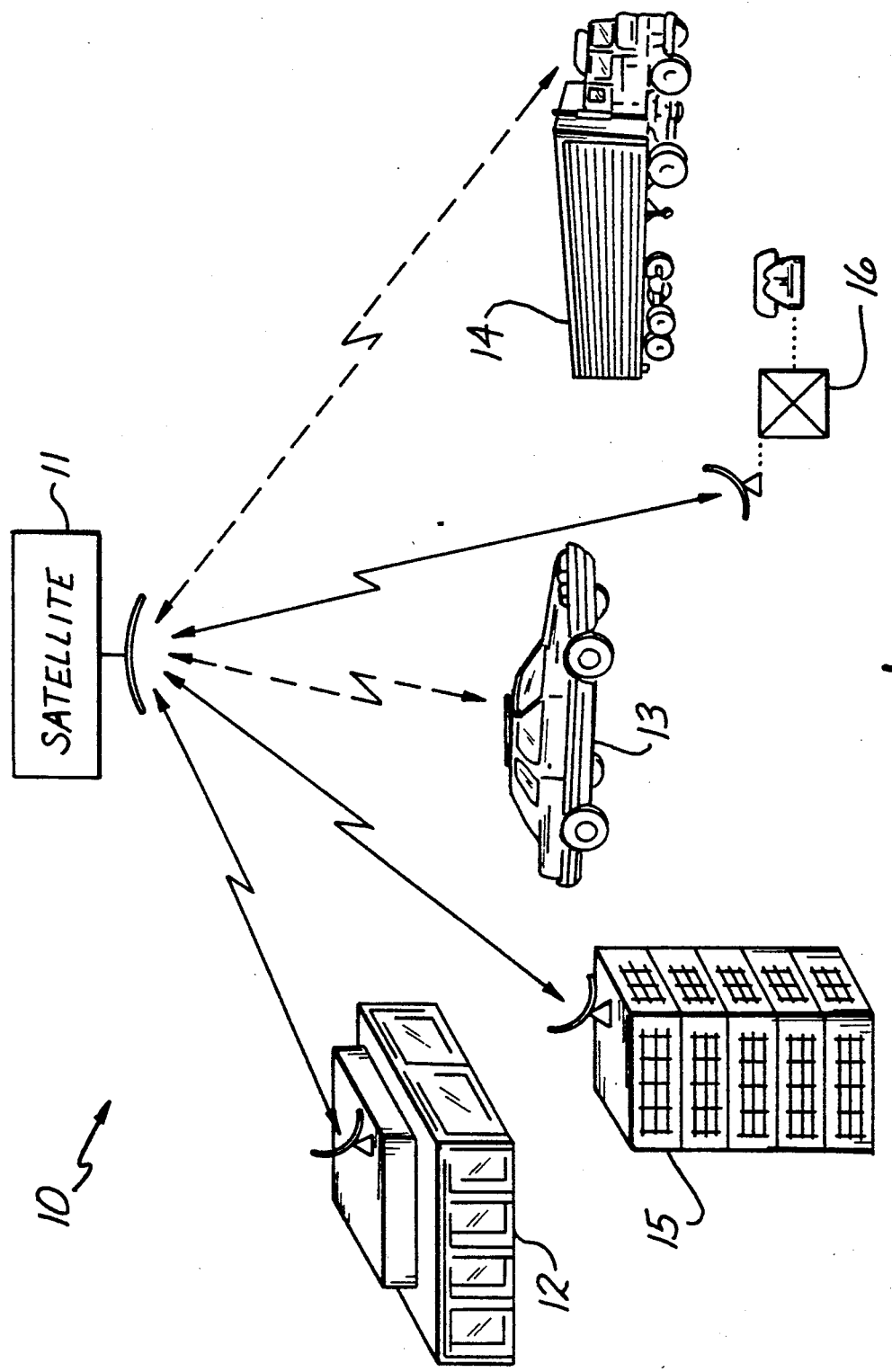
FIG. 1 of the drawings is a diagrammatic representation of a communications satellite system constructed according to the invention.

FIG. 1 shows a satellite communications system 10 constructed according to the invention. Generally, it includes an orbiting communications satellite 11 and a network management center 12 (subsequently referred to as NMC 12). The satellite 11 performs the function of relaying communications to and from a plurality of ground stations 13–16 (i.e., terrestrial stations). The ground stations may take any of various known forms, such as a mobile terminal (MT) in an automobile or a truck (e.g., the ground stations 13 and 14), a base station (BS) at a dispatcher's location (the ground station 15), or a gateway (GW) providing an interface to a public switched telephone network (the ground station 16). In other words, the term ground station is intended to include any of various forms of terrestrial stations, whether fixed, portable, or mobile.

The satellite 11 relays communications to and from the ground stations 13-16 according to connections made by the NMC 12. The NMC 12 takes the form of a computerized, earthbound control center that performs the function of making connections (i.e., sending communication channel assignments) via the satellite 11 to the ground stations 13-16 in response to connection requests received from the ground stations 13-16. For that purpose, the NMC 12 may take any of various known forms and utilize many known components and design techniques, including known computer hardware and software. But according to a major aspect of the invention, the NMC 12 is configured to provide both open-end service and closed-end service. It is configured to respond to a connection request that specifies a requested one of open-end service and closed-end service according to a predefined channel access protocol by sending a channel assignment to the ground station that provides the requested one of open-end service and closed-end service. It may use known satellite communications equipment, but it does so in a way implementing the inventive system architecture subsequently described.

The Land-Mobile Network

Thus, the basic network elements of the system 10 are the communications satellite 11 and the NMC 12. They function to provide satellite communications between mobile terminals (MTs), base stations (BSs), and gateways (GWs). The MTs, BSs, and GWs serve as ultimate connection endpoints from the satellite communications system and they may provide interfaces to additional network elements. They are the direct sources and sinks of traffic. The NMC 12 is the brain of the system with responsibility for the allocation of the satellite channel resources and for enabling the connections between the ground stations 13-16. For that purpose, the NMC 12 is configured with computer controlled communications equipment and programming suitable to accomplish the functions described.

Figure 2:
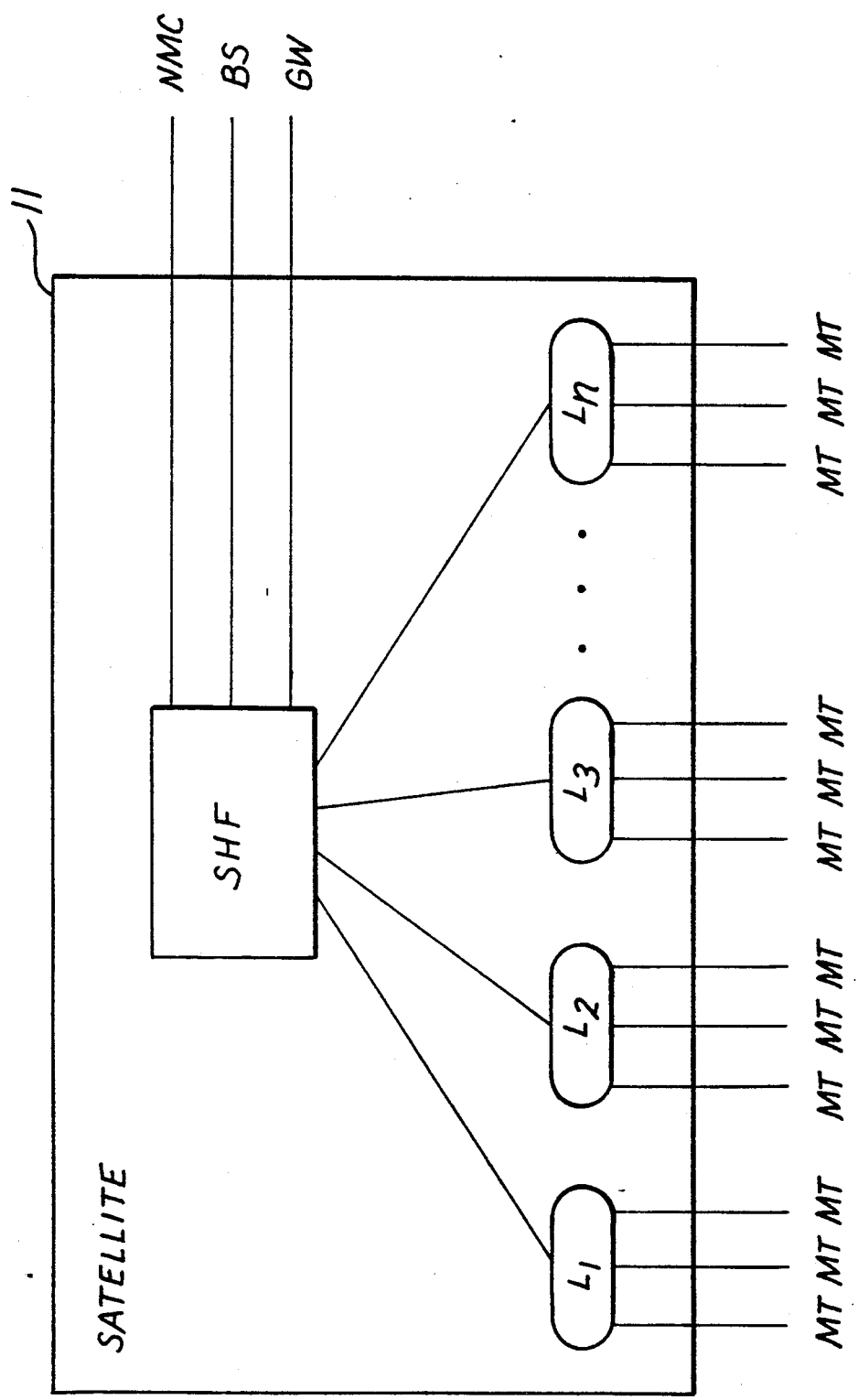
FIG. 2 is a diagrammatic representation of the frequency translation performed by the communications equipment onboard the satellite.

FIG. 2 illustrates physical translation performed by the satellite 11. In a broad sense, it represents any of various types of spacecraft in any of various types of orbits about a terrestrial body, and it is configured to use the frequency allocations made by the 1987 International World Administrative Radio Conference that give the land mobile satellite service a 7 MHz L-band uplink bandwidth (MT to satellite) and a 7 MHz L-band downlink bandwidth (satellite to MT). The uplink allocation is located roughly around 1.65 GHz while the downlink allocation is located in the vicinity of 1.55 GHz. The satellite 11 is configured accordingly. It may include two 5 m L-band antennas, for example, one for transmitting and one for receiving. The L-band antennas may be configured to cover the continental United States with four spot beams to achieve a frequency reuse factor of 1.33, the multiple L-band beam capability being indicated by L through $L_n$ in FIG. 2. Each 7 MHz is divided into 1400, 5 KHz channels that are evenly distributed among the first three beams, resulting in 466 channels per beam or a total of 1864 channels for the entire system. Since at least one channel is required within each spot beam for new MTs to log into the network, a maximum of 465 channels per beam is available for making connection requests, data transmissions, and voice conversations. Of course, the foregoing is just an example, and any of various other configurations may be employed.

The satellite 11 also includes a single full-coverage K-band, super high frequency (SHF) beam (e.g., around 12-14 GHz) for communicating with the NMC 12 as well as the BSs and the GWs. It is indicated by the box in FIG. 2 labelled "SHF" and it is configured according to known techniques to provide distinct K-band channels corresponding to the L-band channels in each beam. The satellite 11 provides only a repeater (with appropriate frequency shift) function. The MTs communicate with the satellite using L-band and each L-band channel is translated to/from a unique K-band channel for communications with the NMC 12, a BS, or a GW. Thus, communications between the NMC 12, a BS, or a GW take place via a K-band cross-strap through the satellite 11, although they could also be accomplished via terrestrial links. All elements of the network are able to communicate with the NMC 12 in a single hop through the satellite 11. MT-to-MT communications require two hops through the satellite, with a suitably configured BS providing the necessary K-band translations.

Connections

The logical connectivity of the network is defined as the matrix of all permissible communications between network elements, i.e., who is able to communicate with whom. The logical connectivity depends upon both the mode of operation (dispatch, telephone, etc.) and the association of particular elements as a sub-network (e.g., of the same trucking company). FIG. 3 illustrates the logical connectivity for the system 10. Column A specifies the originating or calling party (MT and BS). Column B specifies one of four Modes for each of the originating parties in Column A. Column C specifies the connectivity for MTs subscribed to the same BSs that applies for each originating-party-and-mode combination, Column D specifies the connectivity for MTs subscribed to different BSs for each of those combinations, and Column E specifies the connectivity for BSs for each combination. For example, a mobile telephone terminal communicates only with its affiliated BSs. Enforcement of that connectivity is accomplished as part of the channel assignment function of the NMC 12.

There are typically two types of mobile terminals (MT), mobile telephone terminals and mobile dispatch terminals. Mobile telephone terminals have only a voice generation/reception capability, but mobile dispatch terminals (and base stations) have both a voice and data generation/reception capability. Preferably, the NMC 12 exclusively uses data signalling for all its control communications, although a voice reception capability can be used instead for the purpose of monitoring voice channel communications characteristics.

Each MT (either telephone or dispatch terminal) may be affiliated with a particular BS or group of BSs and, in the system 10, may only communicate with that BS or that group of BSs. Voice communications between MTs may be provided without departing from the broader inventive concepts disclosed. Dispatching is normally organized along company or fleet lines. Thus, members of a dispatch fleet are allowed only to communicate with others in the same fleet. Within a dispatch fleet there are terminals with the capability of voice, data, or voice and data, and so the logical connectivity is defined such that the MTs wishing to communicate are compatible.

Communications between dispatch terminals are routed through the same affiliated BS or the originating terminal's BS (if they are not affiliated with the same BS). This connection requires two hops between the earth and the satellite 11. The setup of this structure is for the connecting BS to be able to monitor the connection and perform other supervising services such as billing and emergency interruption. All MTs and BSs can communicate with the NMC 12 itself for the purpose of establishing connections.

The two basic connections from a network capability point of view are those already identified, the open-end connection (open-end service) and the closed-end connection (closed-end service). Open-end connections are such that the duration of the service is not specified at the time the connection request is initiated. It is normally for a voice conversation or long data file transfer. Such open-end connections are in real time so that a fixed delay equal to the propagation time occurs between a transmission and its delivery to the end user. This real-time requirement limits the application of schemes such as Automatic Retransmission reQuest error control techniques (ARQ) to improve the link transmission. However, real time is not required for transferring a long data file. Hence, ARQ error control schemes can be utilized to improve reliability. Voice conversations and open-end file transfers are performed in the system 10 between the MT and BSs only, although MT-to-MT open-end connection may be provided without departing from the broader inventive concepts disclosed. Connections are made based on the availability of the channel and the destination. The connections are kept as long as the subscriber wishes.

Closed-end connections are such that the duration of the service (i.e., the channel holding time) is predetermined based upon the amount of data to be transferred. It is normally for transmitting short messages between the MT and the BS, or, the MT and another MT. Besides, although the message must be delivered in a timely fashion, the service of this kind of connection need not be in real time. This permits the use of ARQ error control techniques to improve the fidelity of the message. Data transmission for closed-end connections are performed from MT to BS, BS (dispatch) to MT(s), or MT to MT. Connections follow a queuing discipline whereby pending data transfers are scheduled by the NMC at the time of their request. Point-to-point data transfers include acknowledgements. Dispatch to many mobiles (i.e., "multicast") may include an acknowledgement.

Short message transmission using closed-end connection consists of two one-way data connections separated in time. One is the forward link for transmitting the message from a mobile unit to its destination, i.e., another mobile unit or a BS, and the other is the return link for conveying the acknowledgement from the destination to the sender. The transmitting data message is queued for service and can be divided into multiple packets (the number depending on message length). The number of packets may be limited to a number mindful of efficiently utilizing channel throughput. Long data file transfers for the open-end connection are provided by a full-duplex link. The file is packetized. Any packet corrupted due to channel errors is retransmitted during the same connection session. That is, the channel is not relinquished until all packets within the same file are correctly received.

The voice dispatch provided by the open-end connection is half-duplex, connecting the dispatch (at the BS) to one or more mobiles on a single beam or connecting a mobile to one or more mobiles all within the same beam. With the exception of a mobile-originated call to a dispatch operator, all connections are made under a Block-Calls-Cleared (BCC) protocol, meaning the call is returned with a busy tone if there is no circuit available or the destination is engaged in another service. The mobile-to-dispatch calls are processed under a Blocked-Calls-Queued (BCQ) protocol because of the possibility of many mobile users desiring access to a single dispatcher. BCQ protocol for this specific connection prevents repetitively blocked connection requests from fleet mobiles when the dispatcher himself is already engaged in another connection. Telephone connection are full-duplex voice from/to MT to/from its affiliated BS, connections being made on a BCC basis.

Structure

The dynamic channelization aspect of this invention enables the system 10 to more efficiently utilize the available bandwidth. The MTs follow a Demand Assigned approach to access the network. It is a two step approach. The first step makes use of the CAP to make connection requests for open-end and closed-end communications. The second step makes use of the connection protocol to communicate traffic. In such an approach, the fundamental resource (i.e., the satellite 11 and its operational frequency bands) is shared among all ground stations. Each MT must make a connection request to the NMC 12 before the actual connection set up. With the entire L-band within an antenna beam divided into 5 KHz channels, the channels within any one beam are grouped at any given instant according to current traffic conditions for each service. That is accomplished in the system 10 by configuring the NMC 12 to make the connections between the ground stations over a plurality of channels. The NMC 12 is configured to allocate some of the channels to open-end service and some of the channels to closed-end service, and to change the number of channels allocated to each service according to changes in the distribution of the connection requests between those specifying open-end service and those specifying closed-end service.

In the system 10, the NMC 12 is configured to operate with four functional types of channels: request channels, command channels, open-end channels, and closed-end channels. Request channels are used for MTs to access the NMC 12 for initialization and making connection requests. Command channels are used by the NMC 12 to provide control information to the users regarding acknowledgments of request channel traffic, connection attempts by other users, and network status information. One command channel is designated as the "wake-up" channel to provide information for terminals to log-in to the network. Open-end channels and closed-end channels are used, respectively, for the actual transfer of traffic in the course of an open-end connection and a closed-end connection. The distinction between open-end channels and closed-end channels is that already described for the open-end connections and closed-end connections.

Figure 4A:
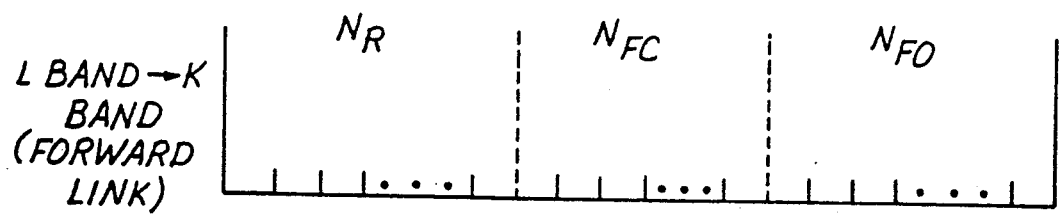
FIGS. 4a and 4b combined provide an is a example of channel partitioning.
Figure 4B:
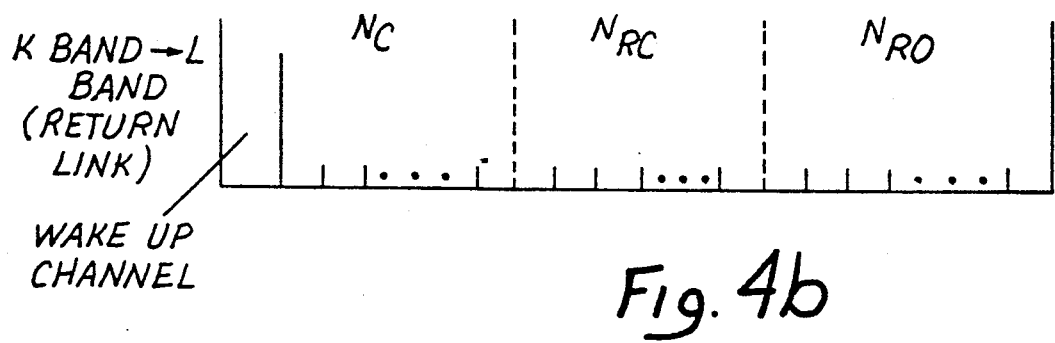

Efficient utilization of the channels is accomplished with an algorithm referred to as an Integrated-Adaptive Mobile Access Protocol (I-AMAP) that is based on the Demand Assigned concept. The NMC 12 is configured to dynamically partition the channels into the four functional groups described above based on the demand for open-end connections and closed-end connections. FIG. 4 illustrates an example partition of the channels. The channels supporting the same function need not be contiguous, but are shown as such for ease of presentation. $N_R$ represents the number of request channels and $N_C$ represents the number of command channels, including the wake-up channel. $N_{FC}$ represents the number of closed-end channels in the forward link and $N_{RC}$ represents the number of closed-end channels in the return link. Similarly, $N_{FO}$ represents the number of open-end channels in the forward link and $N_{RO}$ represents the number of open-end channels in the return link.

The available bandwidth of the system 10 is configured into paired channels, one in the forward direction (from L-band to K-band), and one in the return direction (From K-band to L-band). In either link, the bandwidth is grouped into three types of channels as indicated in FIG. 4 (the wake-up channel in the return link being considered to be one of the command channels). A message sent in a particular channel is acknowledged in the corresponding paired channel. The NMC 12 is responsible for the assignment of channels. It periodically estimates the arrival rate for open-end and closed-end connection requests and finds the optimal partition among three types of channels in the forward link to minimize the overall end-to-end closed-end message delay under a constraint of blocking probability for open-end connections (the paired channels in the return link automatically partitioning accordingly). Each channel may be assigned by the NMC 12 as any type of channel. The NMC 12 informs the MTs of all channel reassignments. To ensure that a MT does not find itself trying to access an obsolete request channel, reassignments are activated after a waiting period, typically one round-trip propagation delay. The identities of the request channels are transmitted on the wake-up channel. Communications between the MTs and the BS, or between MTs and the NMC 12 are routed through the satellite 11. Communications between the BS and the NMC 12 may be routed over terrestrial links or K-band cross strap links.

When a MT first logs in to the network, it tunes to the wake-up channel, finds the identities of the currently assigned request channels, and sends a registration message on one of the request channels. This registration message is transmitted and acknowledged as if it were a connection request. When the MT is not engaged in an ongoing connection, it is under control of the NMC 12. Whenever it wishes to make a connection, it monitors the wake-up channel and finds the identities of the currently assigned request channels. It then gains access to the NMC 12 by transmitting a connection request using a Channel Access Protocol (CAP) over a set of selected request channels. Any collision in the request channel(s) must be resolved based on the CAP implemented to ensure the error-free reception of the request message at the NMC 12. The connection request consists of the origin and destination addresses, and whether it is an open-end or a closed-end connection request. In addition, in the case of a closed-end request, the MT also divides the message into fixed length packets and saves them in its transmitting buffer. The packets are sequentially numbered so that they can be acknowledged individually. The length (in packets) of the message being sent is also included in the request packet. New messages which are generated before all packets in the transmitting buffer are properly acknowledged are stored in the queuing buffer and then transferred to the transmitting buffer when that becomes available. The request for connecting the message will not be made until it is transferred to the transmitting buffer. BSs make connection requests over K-band cross-strap links, but they could do so via terrestrial links with the NMC 12.

After sending out a request, the requesting MT then waits for a channel assignment from the NMC 12 at the paired command channel. If an assignment is not received with a preset time-out period, or if the assignment message contains errors (as determined by a cyclic redundancy check), the requesting MT retransmits the request according to the CAP. In this procedure of making requests, the NMC 12 is responsible for processing all requests for communications, and accordingly assigns channels for connection. In the case of a closed-end connection, this also includes scheduling transmissions.

For an open-end connection, when the connection request arrives successfully at the NMC 12, the NMC 12 checks whether the destination party (i.e., the ground station being called—either BS or MT) is busy in other service or whether all open-end channels are occupied. In either case, the NMC 12 sends a busy status to the requester. Otherwise, the NMC 12 assigns the request to one of the available open-end channels, and sends an assignment message to both the requester and the destination party (assignment messages are treated as the acknowledgment to the request messages). The assignment message contains the identity (ID) of the requester and destination, and the ID of the assigned open-end channels.

After receiving the assignment message, the requester tunes to the assigned open-end channel and starts the conversation or transmitting an open-end file. At this stage, control responsibility is transferred to the intermediate BS from the NMC 12. The cognizant BS monitors the connection and signals the NMC 12 in the event of connection failure or disruption. The channel is held as long as the service lasts. Notice that the BS must be a party involved in an open-end connection. When the conversation or file transfer is completed, the BS initiates the relinquishment procedure by sending a packet directly to the NMC 12 for taking down the channel. This packet contains IDs of both parties and the ID of the channel that is to be taken down. Once the connection is relinquished, control responsibility returns to the NMC 12.

Figure 5:
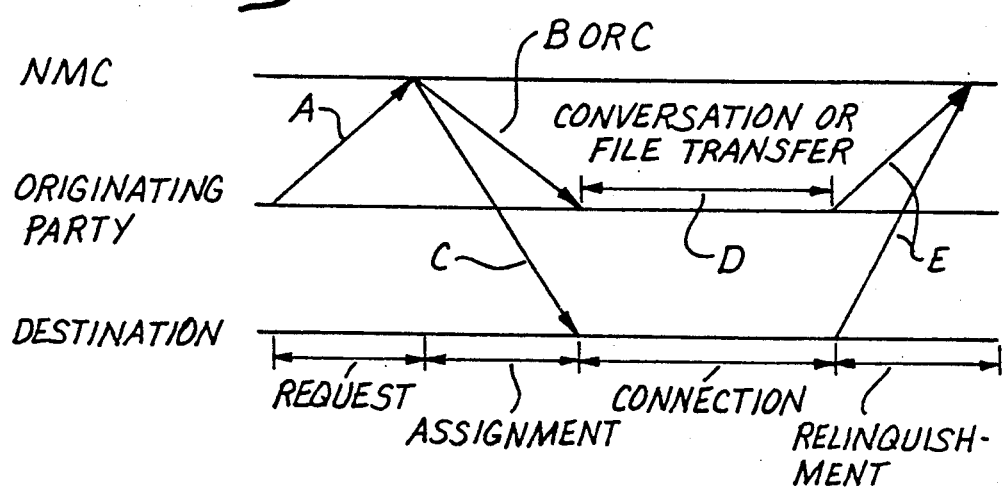
FIG. 5 shows the open-end connection procedure.

FIG. 5 shows this procedure for making an open-end connection. The originating party sends a request for a connection to the NMC 12 as represented by the arrow designated by a letter A in FIG. 5. If the destination is busy or all of the open-end channels are occupied, the NMC 12 sends a busy status to the originating party as represented by the arrow designated by a letter B. If the destination is not busy and the circuit is available, the NMC 12 assigns the connection to one of the open-end channels at the arrow C. Then both the originating party and the destination tune to the assigned channel and start the conversation or file transfer at the arrow D. After the conversation or file transfer, the BS (of either the originating party or the destination) sends a relinquishment message to the NMC 12 at the arrow E.

In the case of an open-end file transfer, the file is partitioned into packets. Errors in each packet are detected and the packet is positively or negatively acknowledged individually (the channel for sending acknowledgments is the paired-channel for the channel used for transmitting since, in this case, a full-duplex channel is used). The packets that are received with errors are negatively acknowledged and then retransmitted. The retransmission is performed during the same connection period. That is, the connection will not be terminated until all packets within the same file are positively acknowledged.

For a closed-end connection, when the connection request arrives successfully at the NMC 12, the NMC 12 assigns, on a first-come-first-serve basis, a closed-end channel and its paired acknowledgment channel for this particular connection. The closed-end channel selected is that with the least backlog. The NMC 12 then sends channel assignment messages to the requester. The assignment message contains IDs of both the requester and destination, the ID of the assigned closed-end channel, a hold time $d_H$, and the ID of the acknowledgment channel. The holding time is calculated such that all messages previously assigned to the same closed-end channel for transmission will be completely sent out. The same assignment message is also sent to the destination.

Figure 6:
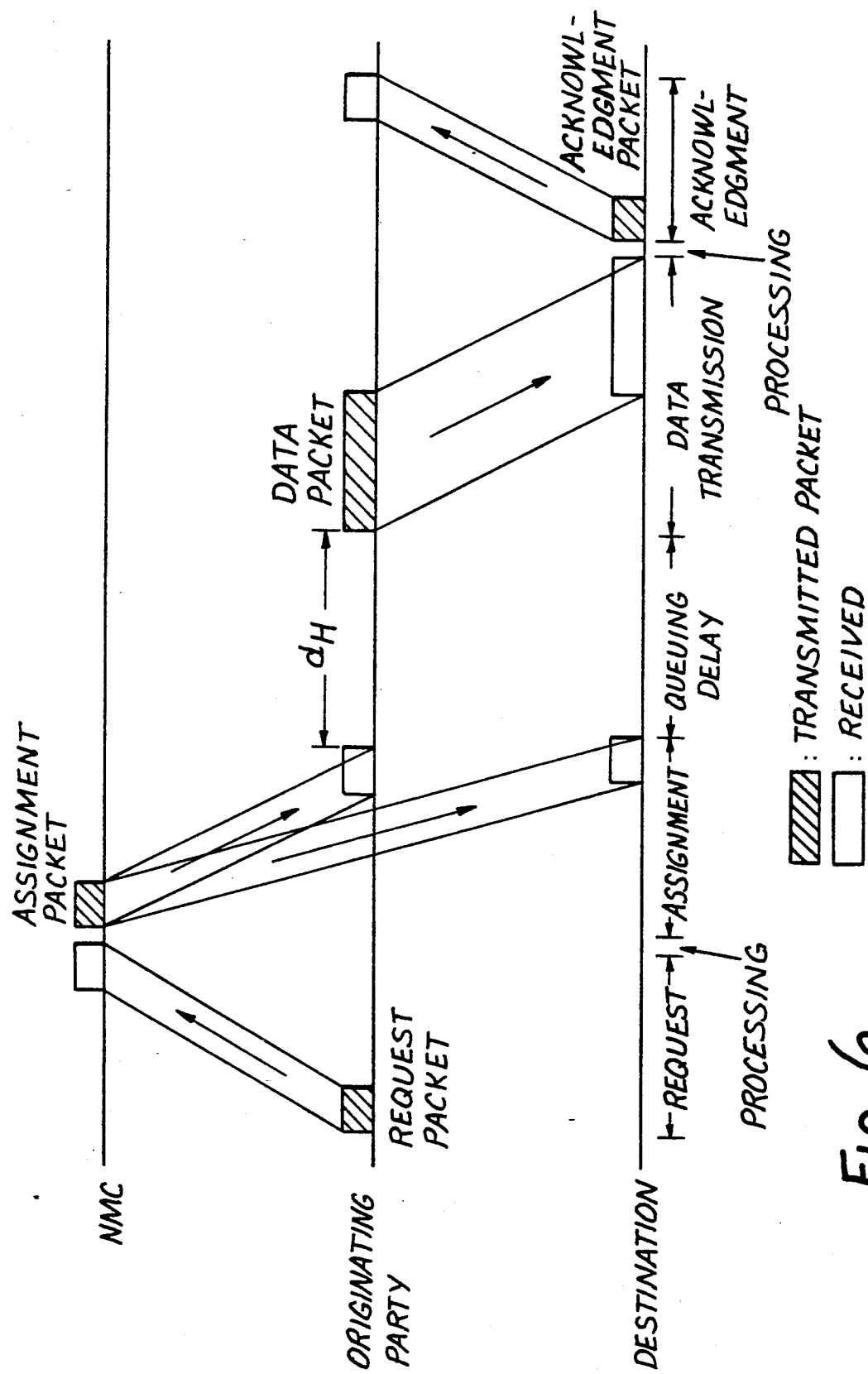
FIG. 6 shows the closed-end connection procedure.

At this moment, the NMC 12 transfers control to the intermediate BS. After receiving the assignment message, the requester waits for the specified holding tim $d_H$ and sends all the packets in its buffer corresponding to this message over the designated closed-end channel. It then waits for an acknowledgment at the paired acknowledgment channel. During the connection period, the cognizant BS monitors the service and then returns the control back to the NMC 12 if the service is successfully accomplished. FIG. 6 shows the process of making a closed-end connection. In any event of service disruption, the sender does not receive the acknowledgment message within a pre-set time-out period (the propagation delay to the destination and back, plus the transmission and processing delay of the message), and then the entire procedure is re-started from the very beginning.

The message in the closed-end connection is also packetized. The acknowledgment message received indicates those packets that are received with error. In the case that the packets are not acknowledged, the sender attempts a retransmission. The packets in its transmission buffer which are positively acknowledged are discarded first. Then a connection request is made on behalf of all unacknowledged packets. This procedure is repeated until all packets in its buffer corresponding to the message have been positively acknowledged.

Channel Access Protocol(CAP)

The rules followed in the procedure of sending connection requests and waiting for their acknowledgement is the Channel Access Protocol (CAP), and the following expands upon that aspect of the system. In random-access communications, collisions occur when two or more packets are simultaneously transmitted over a channel, and the CAP must manage them. Collision resolution algorithms are methods which govern the retransmission of collided packets in such a way that every collided packet is eventually successfully transmitted with finite delay, and all transmitters involved become aware of exactly when this occurs. A packet collision is said to be resolved precisely at the point when all transmitters involved simultaneously become aware that the colliding packets have been successfully transmitted. Such algorithms operate in a slotted-time environment and require broadcast feedback information from the receiver to all the transmitters of the channel collision state in each slot. They can improve the system throughput at the expense of slightly higher complexity.

The system 10 employs a new and improved CAP that includes what is referred to as a free-access tree algorithm. It is inherently stable and dead-lock free at throughputs up to 0.402 packets per channel per slot for a network with three request channels. Let N be the total number of request channels available for MTs to access the network. Similar to the known CAP referred to as the modified slotted ALOHA, these N channels are synchronously slotted. In other words, all MTs are synchronized for each slot time, which equals one request-packet length plus a guard time. Packet transmissions are allowed only at the start of a slot. The fundamental operation of the algorithm involves newly arriving packets being immediately transmitted at the first available time slot on a randomly selected channel. Any collision over one of the N channels is resolved on a channel-by-channel basis. That is, the system will not start to resolve any collision which occurred on a channel (i) until all collisions on channels (1) through (i−1) are resolved. During the process of resolving a collision which occurred on channel (i), any retransmitted packet can be sent over any one of the N channels.

Stated another way, the free-access tree algorithm coordinates user retransmission of collided packets by sending a feedback packet to the user terminal in the event of a collision. It keeps track of channel history (past collisions) and coordinates collision resolution among all users. That is different from the ALOHA protocol which merely has the NMC retransmit its own collided packets without regard for other user collisions; other users must fend for themselves and retransmit collided packets as best they can.

With the free-access tree algorithm, every MT must be able to receive feedback information from the NMC 12 as to whether packet collision occurs in any of the N channels during every single slot (even when the user itself is not transmitting a packet). At any given time, each MT is allowed to have at most one packet either ready for transmission or in the process of being transmitted. Any new packet arriving before the previously colliding one is resolved is stored in the buffer. After the prevailing packet is successfully received, only the earliest packet in the buffer is released.

Each terminal (i.e., ground station) also implements a counting algorithm to determine the slot time at which it must retransmit the packet. Assume that channels are indexed by 1, 2, ..., N, and that the tree algorithm always starts to resolve collisions from the channel of the smallest number to that of the largest number. Let C be the value of the counter in a ground station of interest. Packet transmissions are initiated at the start of a slot only when C=0. The counter value C is incremented or decremented at the end of each slot based on the channel state feedback information of all N parallel channels.

According to the rules for this counting algorithm, C is initially set to zero. C must be zero when any new packet starts to be transmitted. If C=0 at the start of a slot, then C remains unchanged if either the user terminal does not have a packet ready for transmission or a packet has been sent without collision. When C=0 at the start of a slot and the user's transmitted packet has just suffered a collision on a channel (j) in that slot, then C is set to be (i), where (i) is the number of channels with index smaller than (j) which have packet collisions in the same time slot. When C>0 at the start of a slot, C is decreased by one if there are no packet collisions over all N channels. In the case that packet collisions occur in (k) out of N channels in that slot, C is increased by (k−1). If the packet has not been successfully transmitted, it is retransmitted immediately following the slot in which C reaches zero. FIG. 7 shows a flow chart of this counting algorithm which starts at the beginning of each slot.

It is clear that the value C is positive if and only if it has a collided packet waiting for retransmission. This collided packet's next retransmission time occurs when C becomes zero. The following example serves to illustrate the operation of this CAP, Table A showing the evolution of the packet transmissions.

TABLE A

| | Packet Arrivals and Transmissions | | | |
|---|---|---|---|---|
| Slot Number | Channel 1 | Channel 2 | Channel 3 | New Packets |
| 1 | A,B,C | D,E | F,G | H,I |
| 2 | A,B,I | C,H | — | J |
| 3 | A,I | B,J | — | — |
| 4 | A | — | I | — |
| 5 | B | J | — | K,L |
| 6 | C,K | — | H,L | — |
| 7 | — | C | K | — |
| 8 | — | H | L | — |
| 9 | D | — | E | — |
| 10 | — | F,G | — | — |
| 11 | — | F | G | — |

Suppose that initially in slot 1, users A, B, and C select channel 1, users D and E select channel 2, and users F and G select channel 3 for transmitting packets. Also, users H and I generate new packets in slot 1. Table B illustrates the evolution of the counter value C of user F.

TABLE B

| Counter C Value of User F at End of Each Slot | | | | | | | | | | | |
|---|---|---|---|---|---|---|---|---|---|---|---|
| Slot Number: | 1 | 2 | 3 | 4 | 5 | 6 | 7 | 8 | 9 | 10 | 11 |
| Counter Value: | 2 | 3 | 4 | 3 | 2 | 3 | 2 | 1 | 0 | 0 | 0 |

All three channels suffer a collision during slot 1. The collision among packets from users A, B, and C must first be resolved, followed by the collision among those from users D and E, and finally the collision among those from users F and G. Notice in Table B that the value of C of user F's counter is equal to two at the end of slot 1 because of the collisions in channels 1 and 2. So in slot 2, the new packets from users H and I are transmitted along with the first retransmissions of the collided packets of users A, B, and C.

Suppose that in slot 2 users A, B, and I select channel 1, and users C and H select channel 2. Also new packets are generated from user J in slot 2. User F's counter value C is now incremented by one to three at the end of slot 2 since there are two channels with collisions in slot 2. Since the collision among packets of user A, B, and I in slot 2 must first be resolved before the collision among those of users C and H in slot 2, packets from users A, B, I, and J are next transmitted in slot 3. It follows from Table A that the collision among packets from users A, B, and I in slot 2 is finally resolved at the end of slot 5. So in slot 6, the resolution of the collision among packets from users C and H in slot 2 is started.

Table A shows that this is completed at the end of slot 8. At this time the initial collision among users A, B, and C is slot 1 has also been resolved. So in slot 9, the resolution of the initial collision among users C and E in slot 1 is started and resolved. Hence, in slot 10 the resolution of the initial collision among users F and G in slot 1 is started. Notice from Table B that user F's counter value C first reaches zero at the end of slot 9, thus indicating its first retransmission in slot 10. This collision is finally resolved at the end of slot 11. In this example, twelve packets are transmitted using eleven slots for a per channel throughput of 0.364.

Notice that the above-described free-access tree algorithm assumes that the feedback information for each slot is known to the users immediately at the end of the prevailing slot. This assumption is valid only when the round-trip propagation delay is negligible compared to the packet transmission time. In any event, the round-trip propagation delay can be included in the slot time in addition to the packet transmission time since the throughput degradation is negligible. However, in the case of significant round-trip propagation delay, a number of interleaved tree algorithms may be operated.

Specifically, suppose that the round-trip propagation delay between transmitters (transmitting ground stations) and receivers (receiving ground stations) is equal to (d−1) slots. Then (d) interleaved copies of the above free-access tree algorithms can be operated. In that case, the first algorithm operates in slots 0, d, 2d, . . . ; the second algorithm operates in slots 1, d+1, 2d+1, . . . ; and so on. The implementation advantage of free-access tree algorithms over other collision resolution algorithms, such as blocked-access algorithms, can be substantial for large propagation delays.

Connection Protocol

In the conventional Demand Assigned/Frequency Division Multiple Access (DA/FDMA) scheme, the user who requests a channel can use it in any type of connection (including packetized data, voice, etc.) for itself or among subordinate users until the channel is relinquished. The user is then billed for the duration of channel use. That scheme is particularly effective for circuit-oriented connections because of the relatively long circuit holding time.

But circuit-oriented connections are inefficient for packet communications. In the Integrated-Adaptive Mobile Access Protocol (I-AMAP) algorithm used in the system 10, the pool of channels maintained by the NMC 12 is adaptively used as request, command, open-end, or closed-end channels. Packet-oriented connections are communicated over closed-end channels while circuit-oriented connections are communicated over open-end channels. The NMC 12 adaptively adjusts the partition between the various channel types to guarantee the level of services provided for each type of connection. In other words, the NMC 12 is configured to make the connections between the ground stations over a plurality of channels, to allocate some of the channels to open-end service and some of the channels to closed-end service, and to change the number of channels allocated to each service according to changes in the traffic pattern (i.e., the distribution of the connection requests between those specifying open-end service and those specifying closed-end service).

Figure 8A:
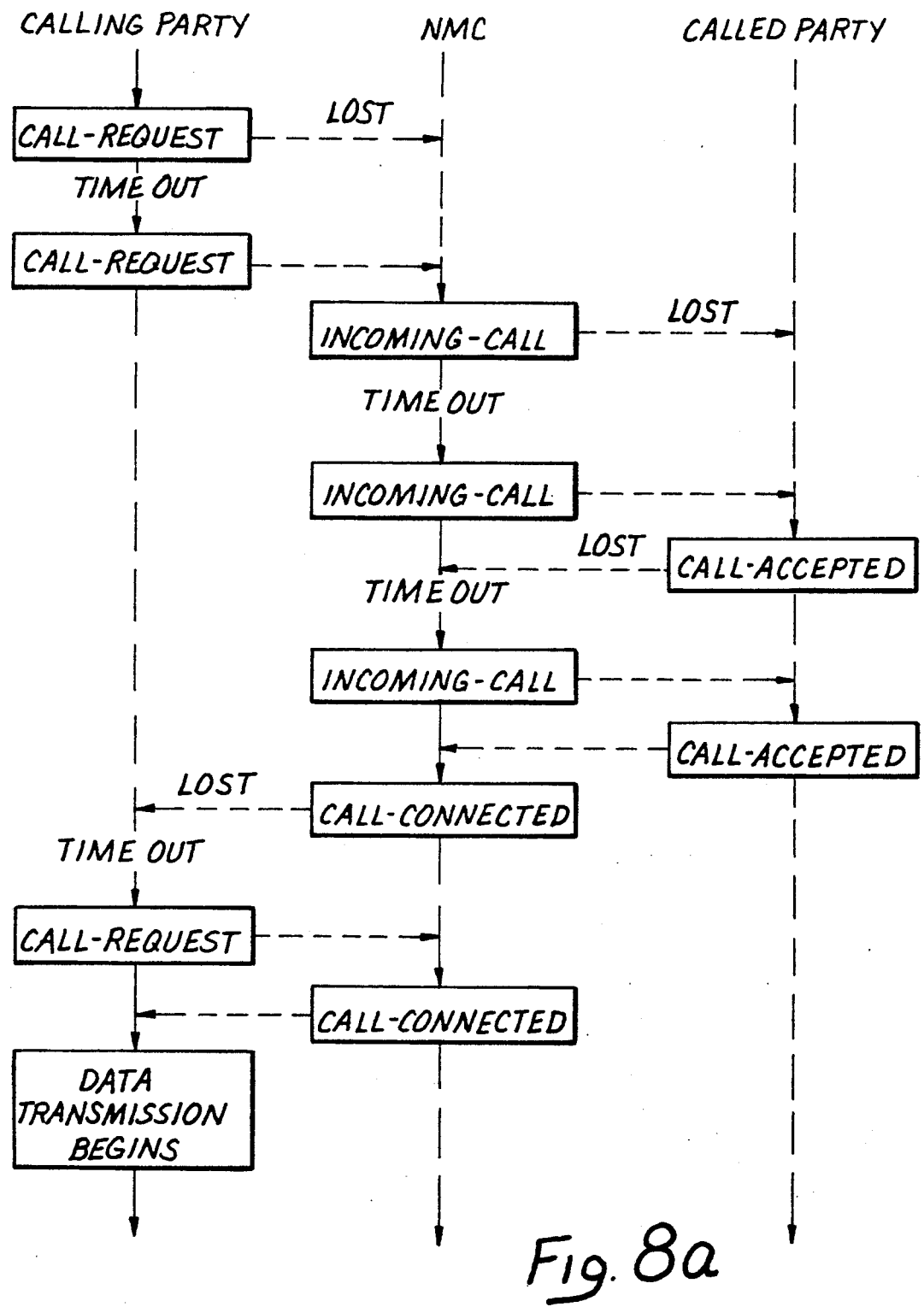
FIGS. 8a–8c illustrate open-end and closed-end connection procedures.
Figure 8B:
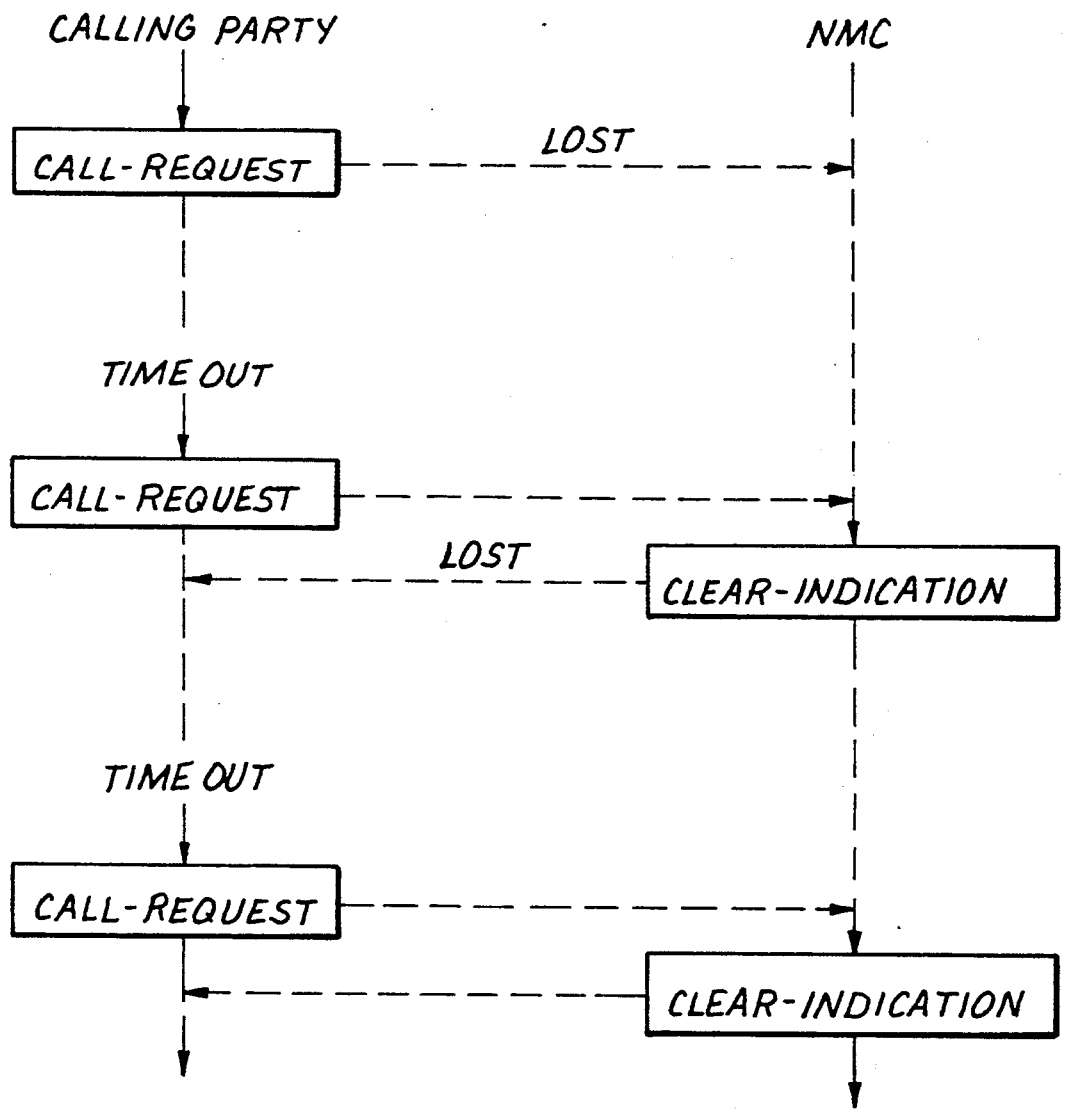
Figure 8C:
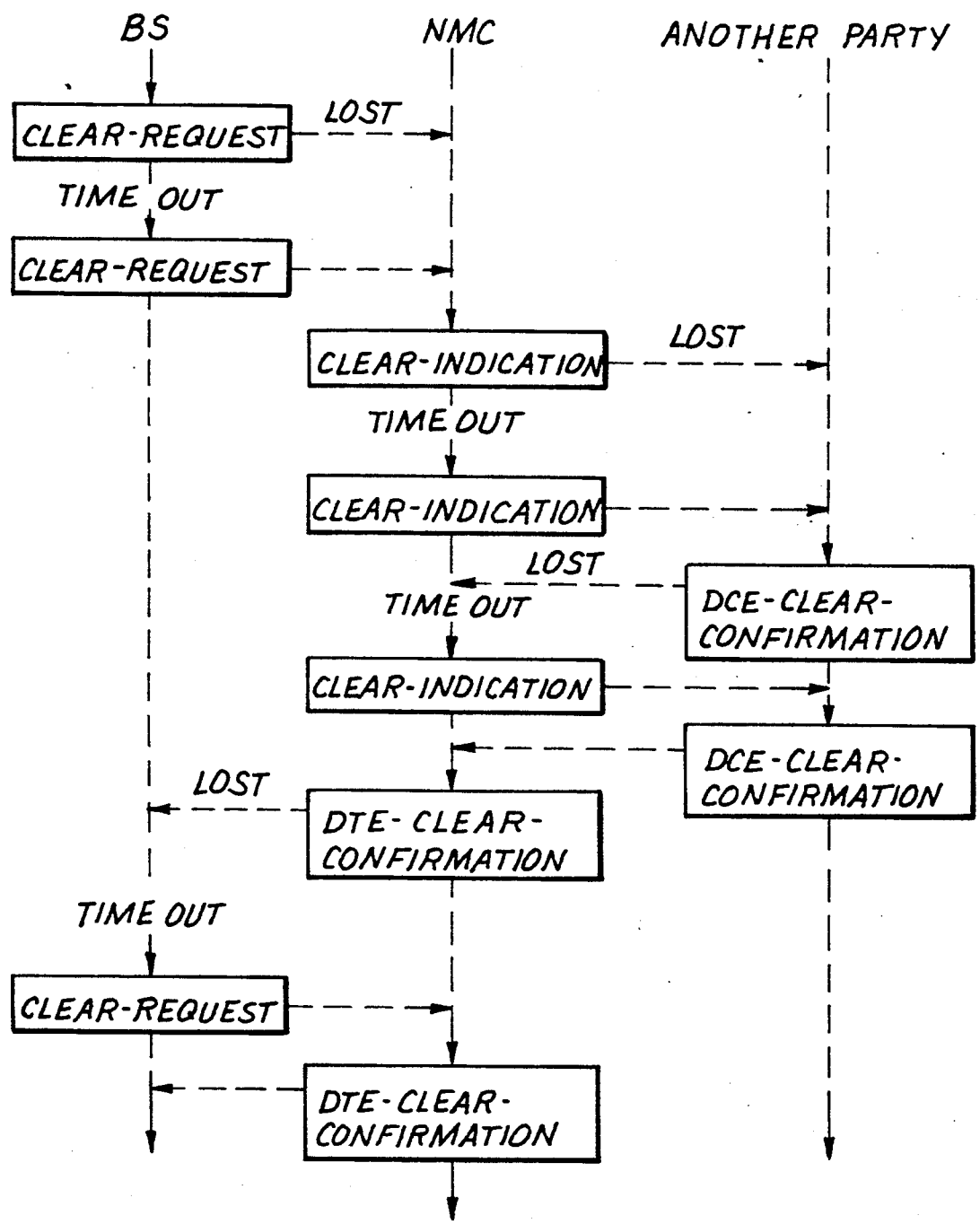

The open-end connection setup and clearing procedures may resemble the corresponding procedures in a conventional telephone system. FIGS. 8a-8c show an example of the actual communications between all parties involved. To establish an open-end session (i.e, and open-end connection) the calling party (either MT or BS) sends a CALL-REQUEST packet to the NMC 12 through on of the request channels following the CAP. Any collision or channel-corrupted packet will be resolved by the CAP. After receiving the CALL-REQUEST packet successfully, the NMC 12 sends an INCOMING-CALL packet to the called party if the called party is not busy and an open-end channel is available (referred to as the line-not-busy case in FIG. 8a. Otherwise, it sends a CLEAR-INDICATION packet back to the calling party (referred to as the line-busy case in FIG. 8b. The INCOMING-CALL packet contains the ID of the assigned open-end channel. This is the assignment packet from the NMC 12 to the called party. After receiving the INCOMING-CALL packet successfully, the called party responds with a CALL-ACCEPTED packet to the NMC 12 through the assigned open-end channel. The CALL-ACCEPTED packet can be viewed as an acknowledgement to the INCOMING-CALL packet.

After successfully receiving the CALL-ACCEPTED packet from the called party, the NMC 12 sends a CALL-CONNECTED packet to the calling party. In case that the CALL-CONNECTED packet is lost or is not received correctly, it is considered to be a negative acknowledgement to the CALL-REQUEST packet and the calling party retransmits the CALL-REQUEST packet according to the CAP. The CALL-CONNECTED packet contains the ID of the assigned open-end channel. This is the assignment packet from the NMC 12 to the calling party. After successfully receiving the CALL-CONNECTED packet, the open-end connection is set up and the calling party starts its conversation or file transfer over the assigned open-end channel.

Notice that the BS must be a party involved in an open-end connection. After an open-end connection is successfully accomplished (in the case of file transfer, that means that all packets are positively acknowledged), the BS initiates the link clearing procedure by sending a CLEAR-REQUEST packet to the NMC 12 through a K-Band cross-strapped link, although it could be done over a terrestrial link. The link clearing procedure is dual to the line-not-busy case of the link-setup procedure with the CALL-REQUEST, INCOMING-CALL, CALL-ACCEPTED, and CALL-CONNECTED packets being replaced by the CLEAR-REQUEST, CLEAR-INDICATION, DTE-CLEAR-CONFIRMATION, and DCE-CLEAR-CONFIRMATION packets, respectively. In that regard, DTE stands for Data Terminal Equipment and DCE stands for Data Communication Equipment. This procedure for taking down an open-end connection is shown in FIG. 8c.

The closed-end connection is similar to the open-end connection except that the NMC 12 does not need to send the INCOMING-CALL packet to the called party and the called party does not need to respond with the CALL-ACCEPTED packet. To establish a closed-end connection, the calling party sends a CALL-REQUEST packet to the NMC 12 through one of the request channels following the CAP in which the duration of the connection is included. Any collision or channel-corrupted packet is resolved by the CAP.

After receiving the CALL-REQUEST packet successfully, the NMC 12 schedules the particular request to one of the available closed-end channels with the shortest backlog on a first-come-first-serve basis. The NMC 12 broadcasts a CALL-CONNECTED packet (the assignment packet) to the calling and called parties. In case that the CALL-CONNECTED packet is lost or is not received correctly, it is considered to be a negative acknowledgement to the CALL-REQUEST packet and the calling party retransmits the CALL-REQUEST packet according to the CAP. The CALL-CONNECTED packet contains the scheduled time window and the identity of the assigned closed-end channels. The CALL-CONNECTED packet also serves as an acknowledgement to the CALL-REQUEST packet.

After successfully receiving the CALL-CONNECTED packet from the NMC 12, the closed-end connection is set up. Notice that the time and duration of the connection is known to both the calling and called parties. The calling party waits until the scheduled transmission time, then sends the DATA packet on the assigned closed-end channel. It then waits for an ACKNOWLEDGEMENT packet from the called party at a scheduled time window. If any portion of the procedure is not successfully accomplished, the calling party retransmits the CALL-REQUEST packet and the procedure starts from the very beginning.

In closed-end connections, both the channel occupation time and the transmission starting time are available to the NMC 12, the calling parties (i.e., the calling ground stations), and the called parties (i.e., the called ground stations). So no clearing procedure is necessary.

The foregoing provides a high-level description of the system 10 network architecture and the inventions it embodies. The system 10 features both open-end service and closed-end service, providing the type requested. That significantly alleviates congestion by providing more efficient (and less costly) closed-end service for short data transfers. The system 10 adaptively changes the number of channels allocated to each service with changes in the voice/data traffic pattern. In addition, it includes an improved channel access protocol based on the free-access tree algorithm described.

Although an exemplary embodiment has been shown and described, many changes, modifications, and substitutions may be made by one having ordinary skill in the art without necessarily departing from the spirit and scope of the invention.

What is claimed is:

1. A satellite communications system, comprising:
    means in the form of an orbiting communications satellite for relaying communications to and from a plurality of ground stations over communication channels that are assigned by a network management center according to connection requests sent via the satellite by the ground stations; and
    a network management center configured to respond to a connection request that specifies a requested one of open-end service and closed-end service according to a predefined channel access protocol by sending a channel assignment to the ground station that provides the requested one of open-end service and closed-end service.

2. A system as recited in claim 1, wherein the network management center is configured to dynamically allocate some communication channels to open-end service and some to closed-end service according to the distribution of connection requests between those specifying open-end service and those specifying closed-end service.

3. A system as recited in claim 1, wherein the communications satellite is configured to provide an L-band link between the satellite and mobile ones of the ground stations and a K-band link between the satellite and the control center.

4. A system as recited in claim 3, wherein the communications satellite is configured to provide a K-band link between the satellite and fixed ones of the ground stations.

5. A system as recited in claim 1, wherein the network management center is configured to respond to each of a plurality of connection requests according to the order in which the network management center receives the connection requests.

6. A system as recited in claim 1, wherein the network management center is configured to resolve packet collisions by coordinating collision resolution among the ground stations.

7. A system as recited in claim 6, wherein the network management center is configured to resolve collisions on a channel-by-channel basis.

* * * * *